United States Patent [19]

Nagano et al.

[11] 4,290,506
[45] Sep. 22, 1981

[54] CENTER-PULL TYPE CALLIPER BRAKE FOR A BICYCLE

[75] Inventors: Masashi Nagano; Itsuo Someya, both of Sakai, Japan

[73] Assignee: Shimano Industrial Company Limited, Osaka, Japan

[21] Appl. No.: 81,176

[22] Filed: Oct. 2, 1979

[30] Foreign Application Priority Data

Oct. 14, 1978 [JP] Japan .......................... 53-141137[U]
Mar. 5, 1979 [JP] Japan ............................ 54-28292[U]

[51] Int. Cl.³ .............................................. B62L 1/16
[52] U.S. Cl. .............................. 188/24.19; 188/24.21
[58] Field of Search ..................... 188/2 D, 24, 205 R, 188/206 R

[56] References Cited

FOREIGN PATENT DOCUMENTS

| | | |
|---|---|---|
| 1627054 | 8/1951 | Fed. Rep. of Germany . |
| 428059 | 6/1911 | France . |
| 603880 | 1/1926 | France .................................. 188/24 |
| 1270686 | 7/1961 | France .................................. 188/24 |
| 2142650 | 2/1973 | France . |
| 360123 | 11/1931 | United Kingdom .................. 188/24 |

Primary Examiner—Duane A. Reger
Attorney, Agent, or Firm—Stevens, Davis, Miller & Mosher

[57] ABSTRACT

A center-pull type calliper brake for a bicycle, which has at the utmost ends of a pair of brake arms pivoted to a fixing arm, holders which are integral with the brake arms for respectively fixing brake shoes. The fixing arm extends from its horizontally intermediate portion upwardly in the pulling direction of a control wire so as to form an extension. The extension has a slot extending along the same. A fixed bolt is inserted into the slot and is adjusted therethrough in its fixed position to fix the fixing arm to the bicycle frame in relation of being adjustable vertically in position. When the position of the fixing arm fixed to the bicycle frame changes with respect to a wheel rim, the fixing arm is vertically adjusted in its fixed position, that is, the brake as a whole is vertically adjusted only, so that the brake shoes may be simply adjusted in proper positions with respect to the wheel rim without the necessary for changing the distance between each brake shoe and the pivot position of each brake arm to the fixing arm.

6 Claims, 13 Drawing Figures

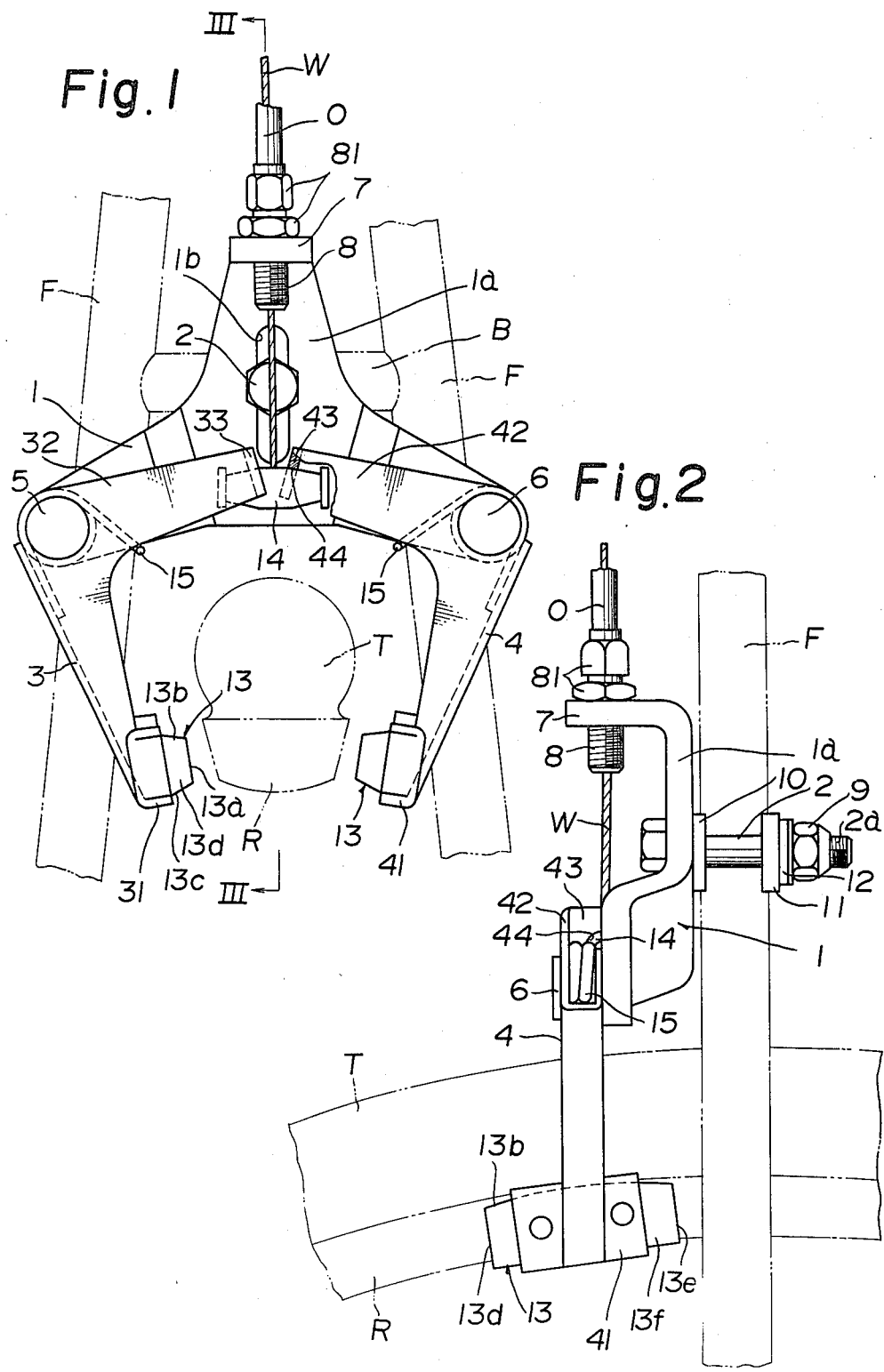

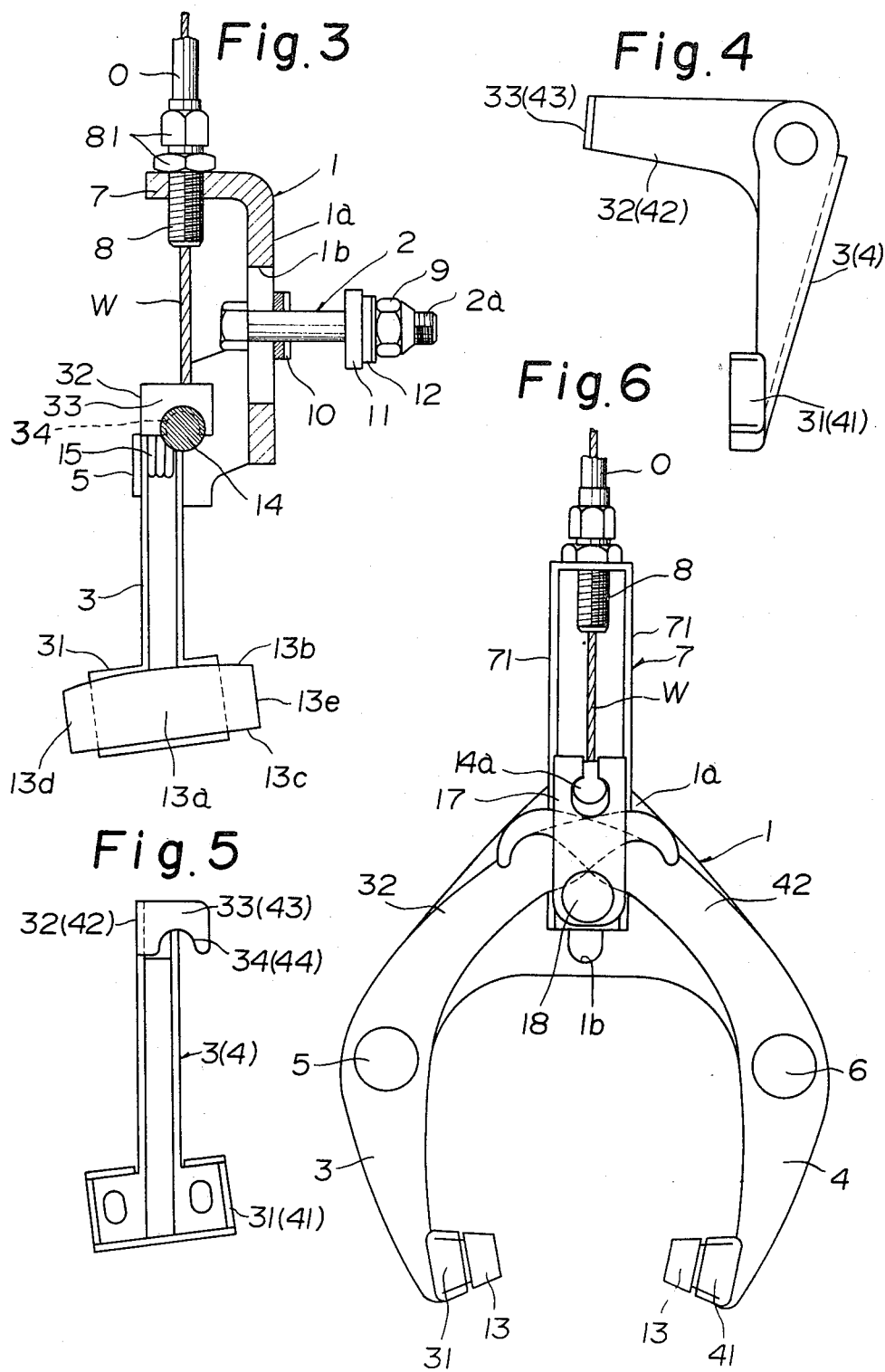

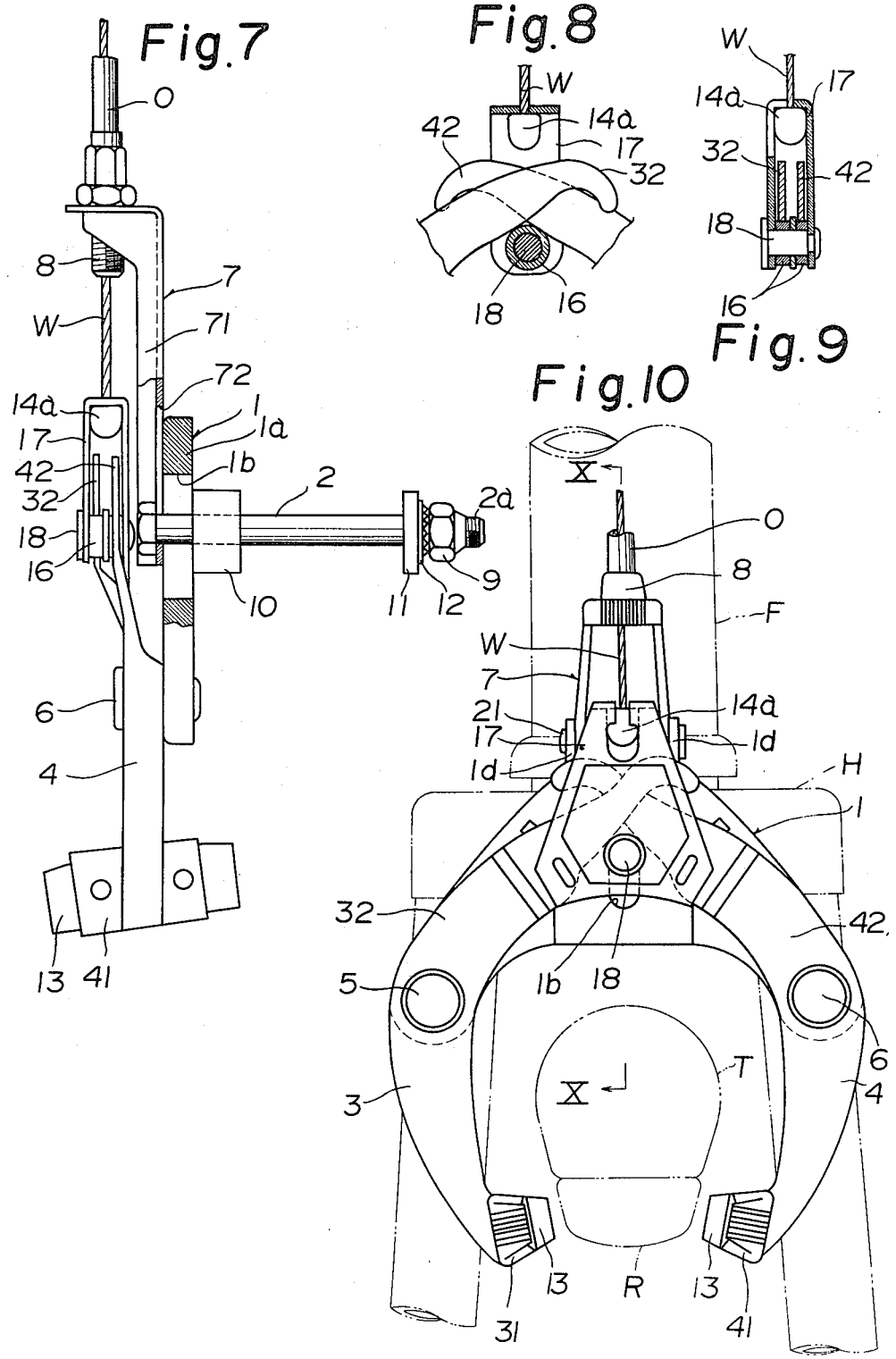

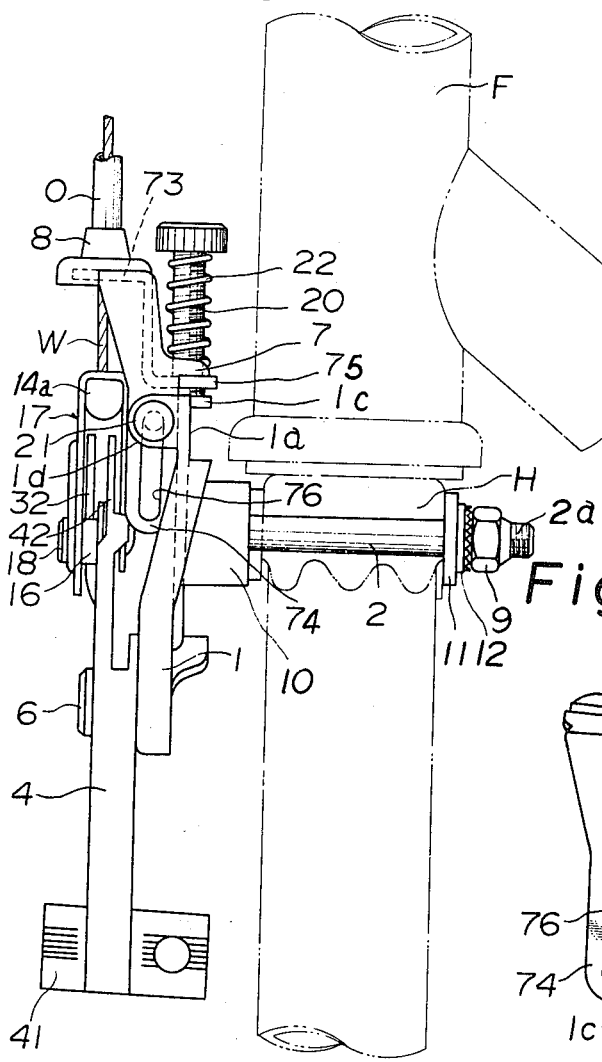
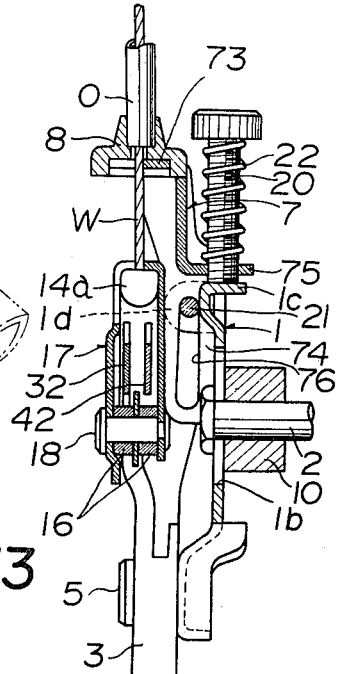
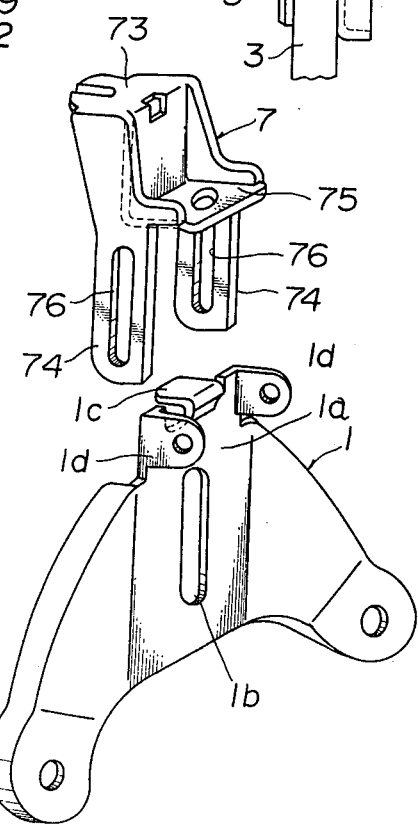

CENTER-PULL TYPE CALLIPER BRAKE FOR A BICYCLE

BACKGROUND OF THE INVENTION

This invention relates to a center-pull type calliper brake for a bicycle, and more particularly to a center-pull type calliper brake which has a fixing arm horizontally arranged, a pair of brake arms carrying brake shoes pivoted to both horizontal ends of the fixing arm, and a fixed bolt for fixing the fixing arm to the bicycle frame, so that a control wire is pulled to press the brake shoes against a wheel rim for exerting the braking action.

Conventionally, this kind of calliper brake is so constructed that the fixing arm is fixed to the bicycle frame through the fixed bolt, the brake shoes are attached to holders formed separately from the brake arms, at the utmost ends of the brake arms are formed bases for the holders, at the bases are formed slots extending vertically, and the holders are mounted through the slots in relation of being vertically adjustable respectively. Hence, the brake shoes carried by the holders are each vertically adjustable correspondingly to different brake mounting positions depending on the type and usage of the bicycle.

Accordingly, each of the brake shoes, which are adjusted in the mounting positions as described, changes its distance from the pivot position of each brake arm. As a result, the length of swinging motion of each brake shoe with respect to the stroke of the control wire is not constant when the wire is pulled for the braking action.

On the other hand, the center-pull type calliper brake spreads a center wire between the upper ends opposite to the brake shoe mounting ends at the brake arms, the center wire being connected with the control wire, so that the brake is complicated in construction and also troublesome in assembly.

SUMMARY OF THE INVENTION

To overcome the aforesaid problems, this invention has been designed. A main object of the invention is to provide a center-pull type calliper brake capable of easily adjusting brake shoes in position with respect to the fixing arm fixed to the bicycle frame even when the positional relation between the frame and the wheel rim varies due to differences in the type of bicycle with which the brake is used. Also, the brake shoes are each adjustable without changing the distance between each brake shoe and the pivot position of each brake arm to the fixing arm, thereby retaining a constant stroke of the control wire when pulled for the braking action. Another object is to provide a center-pull type calliper brake which further has no center wire which is used in the conventional center-pull type calliper brake, whereby a simple construction is achieved which can actuate the brake arms through the control wire. Still another object is to provide a center-pull type calliper brake capable of easily changing a relative length of the control wire to an outer sheath therefor even when the control wire or outer sheath changes in length or the brake shoe wears out, thereby properly and accurately adjusting the distance between each of the brake shoes and the wheel rim opposite thereto.

The inventor has found that the problem of the changing swinging motion length in the conventional calliper brake is due to the fact that the holders carrying the brake shoes are formed separately from the brake arms and are vertically adjusted with respect thereto correspondingly to the fixed position of the fixing arm relative to the wheel rim. Accordingly, in the present invention the holders are fixed to the brake arms and are not adjustable, and the fixing arm pivotally supporting the brake arms is made adjustable vertically in position with respect to the fixed bolt which fixes therethrough the fixing arm to the bicycle frame, thereby eliminating the problem of the changing swinging motion length.

In detail, the calliper brake of the invention is so constructed that; the holders are provided integrally at the utmost ends of the brake arms; the brake shoes are fixed to the holders respectively; a fixing arm pivotally supporting the brake arms extends upwardly, i.e., in the pulling direction of the control wire, from a horizontally intermediate portion of the fixing arm so as to form an extension; the extension having a slot extending in the direction of the same; and a fixed bolt is inserted into the slot so as to be vertically adjustable of its fixed position, whereby the fixing arm is fixed to the bicycle frame through the bolt in relation of being vertically adjustable in position. Hence, when the fixed position of the fixing arm to the bicycle frame changes with respect to the wheel rim, the position of the fixing arm fixed to the bicycle frame is vertically adjusted, that is, the brakes as a whole is vertically adjusted, whereby the brake shoes are simply and properly adjusted in position with respect to the wheel rim without the necessary for changing the distance between each brake shoe and the pivot position of each brake arm at the fixing arm.

The calliper brake of the invention also has at the fixing arm a supporting member for supporting the outer sheath guiding the control wire, and has a retainer attached to a free end of the control wire, the retainer engaging with an extension of each brake arm extending from the pivot position thereof toward the center of the fixing arm, thus eliminating the requirement for a conventional center wire.

Furthermore, the supporting member is changeable in position with respect to the fixing arm in the pulling direction of the control wire, whereby the supporting member can simply adjust the relative length of the control wire to the outer sheath.

These and other objects and novel features of the invention will be more apparent from the following description taken in accordance with the accompanying drawings.

BRIEF DESCRIPTION OF THE DRAWINGS

FIG. 1 is a partially cutaway front view of an embodiment of the calliper brake of the invention, FIG. 2 is a right-hand side view thereof, FIG. 3 is a sectional view taken on the line III—III in FIG. 1, FIG. 4 is a rear view of a brake arm only, FIG. 5 is a perspective view thereof, looking in the direction of the arrow A in FIG. 4, FIG. 6 is a front view of a modified embodiment, FIG. 7 is a right-hand side view thereof, FIGS. 8 and 9 are sectional views of a connecting portion of a control wire with the brake arm, FIG. 10 is a front view of another modified embodiment, FIG. 11 is a right-hand side view thereof, FIG. 12 is a sectional view taken on the line X—X in FIG. 10, and FIG. 13 is a perspective view of the embodiment in FIG. 10, showing its fixing arm and supporting member.

DESCRIPTION OF THE PREFERRED EMBODIMENT

Referring to FIGS. 1 through 5, a first typical embodiment of the invention will be described.

In the drawings, reference numeral 1 designates a fixing arm disposed horizontally, numeral 2 designates a fixed bolt for fixing the fixing arm 1 to a bridge B spanning the bicycle frames F, and numerals 3 and 4 designate a pair of brake arms pivoted swingably to both horizontal ends of the fixing arm 1 through pins 5 and 6. The fixing arm 1, as shown in FIG. 1, extends upward at a horizontal intermediate portion thereof to form an elongate extension 1a. The extension 1a is bent at its uppermost end in an L-like shape to form a supporting member 7 for supporting an outer sheath O guiding a control wire W to be hereinafter described, and has a slot 1b extending vertically, The supporting member 7 has at its substantially central portion a threaded bore. An outer stop 8 for holding an end of the outer sheath O is screwed with the threaded bore and tightened by a lock nut 81.

The fixed bolt 2 has a head of a diameter larger than the width of the slot 1b and at the tip a screw thread 2a to be screwed with a nut 9. Between the head and the nut 9 are inserted a liner 12 and a pair of washers 10 and 11 in contact with the outer periphery of the bridge B. The fixed bolt 2 is inserted into the slot 1b and passes through a bore at the bridge B and is tightened by the nut 9, thereby fixing the fixing arm 1 to the bridge B the fixing arm 1 being desirably adjustable vertically in position within a range of the slot 1b.

The brake arms 3 and 4 are laterally symmetrical as shown in FIG. 1, and are formed by pressing a metallic plate as shown in FIGS. 4 and 5. At the utmost ends of the brake arms 3 and 4 are formed holders 31 and 41 integral therewith. The holders 31 and 41 are each box-like shaped and open at one side, and carry the brake shoes 13 respectively. The brake arms 3 and 4 also have extensions 32 and 42 extending from the positions pivoted by the pins 5 and 6 toward the horizontal center of the fixing arm 1, the extensions 32 and 42 being bent at the utmost ends toward the fixing arm 1 so as to form bent portions 33 and 43. The bent portions 33 and 43 are provided at the lower sides thereof with semicircular cutouts 34 and 44 facing downward.

The control wire W is inserted movably into the outer sheath O to be guided therewith and attached at one end to a brake lever (not shown). To a free end of the control wire W is fixed an engaging body 14 of a barrel-like shape and engageable with the cutouts 34 and 44. The engaging body 14 is engaged with the cutouts 34 and 44 to set the control wire W. The brake lever is operated to pull the control wire W, thereby raising the engaging body 14 and hence the extensions 32 and 42, thus allowing the brake arms 3 and 4 to swing around the pivot pins 5 and 6.

In addition, in FIGS. 1 and 2, reference numeral 15 designates return springs, reference R designates a wheel rim, and reference T designates a tire held by the wheel rim R.

With this construction, when the brake lever near a handle grip is operated to pull the control wire, the brake arms swing to allow the brake shoes 13 to contact with the wheel rim R respectively to thereby exert the braking action.

When the calliper brake changes its mounting position relative to the bicycle frame, the nut 9 is loosened, and the fixing arm 1 is vertically moved along the slot 1b with respect to the fixed bolt 2 and then is fixed in position by retightening the nut 9, thereby adjusting the brake shoes 13 in position corresponding to the brake mounting position. Thus, the brake as a whole moves following vertical movement of the fixing arm so is not necessary to separately move each brake shoe 13 for adjustment. Moveover, in this adjustment, the respective distance between the brake arms' pivot positions and the brake shoes' mounting positions is always constant, thereby always maintaining a constant length of movement of each brake shoe 13 through the swinging brake arm, in other words, the amount of movement of each brake shoe 13 with respect to the stroke of the control wire is not changed to thereby keep the braking ratio constant.

The brake shoes 13 each comprise a block having a braking surface 13a opposite to the wheel rim R, the upper and lower surfaces 13b and 13c and a pair of side surfaces 13d and 13e in continuation of said braking surface, and a rear surface 13f. The upper surface 13b, as shown in FIGS. 2 and 3, is curved in curvature smaller than the wheel rim R, so that even when the fixing arm 1 swings right and left in FIG. 2 during the adjustment, the brake shoes 13 can be prevented from contacting at the upper surfaces thereof with the outer edge of the rim R or tire T.

In the just described embodiment, the engaging body 14 may be replaced by rollers 16 as shown in FIGS. 6 through 9, the rollers 16 being engaged with the extensions 32 and 42. Or, the supporting member 7, which is integrated with the fixing arm 1, may be formed separately therefrom and mounted thereto in relation of being changeable in position in the pulling direction of the control wire.

In detail, in a second embodiment as shown in FIGS. 6 through 9, a swollen body 14a is fixed to the free end of the control wire W and supports a retainer 17 of an inverted U-like shape. Two rollers 16 are rotatably supported to the retainer 17 through a transverse shaft 18, and engage with the extensions 32 and 42 at the brake arms 3 and 4 respectively. Although one roller 16 can be used, it is preferred that two rollers are each provided at the brake arm because the brake arms 3 and 4 move oppositely to each other when engaging with the rollers 16 respectively.

The supporting member 7 in FIGS. 6 through 9, which is elongated in the moving direction of the wire W as shown in FIGS. 6 and 7, carries at the upper end an outer stop 8, has at both widthwise sides reinforcements 71 extending lengthwise of the supporting member 7, and at the center of its width a slot 72 extending lengthwise of the same. A fixed bolt 2 is inserted into the slot 72 to be vertically changeable in position with respect to the fixing arm 1. The bolt 2 is tightened by a nut 9 to thereby fixedly support to the bicycle frame the fixing arm 1 together with the supporting member 7.

Furthermore, the supporting member 7 may be formed as shown in a third embodiment shown in FIGS. 10 through 13, in which the components identical with those in FIGS. 1 through 9 are represented by the same reference numerals.

As seen from FIG. 13, the supporting member 7 comprises a first support plate 73 extending horizontally from the upper end of the same and supporting an outer stop 8 for the outer sheath O, a pair of side plates 74 vertically extending and opposite to each other, and a second support plate 75 connecting the side plates 74 and extending horizontally reversely to the first support plate 73. The side plates 74 are provided with vertical slots 76 respectively, and the second support plate 75 is screwed with an adjust screw 20. A fixing arm 1 carrying the supporting member 7 is provided at the utmost end of an extension 1a with a stopper 1c for the adjust screw 20 and with a pair of third support plates 1d opposite to each other and extending perpendicularly to the extension 1a. The third support plates 1d contact with the side plates 74 respectively, so that the supporting member 7 may be supported to the fixing arm 1 through pins 21 in relation of being changeable vertically in position.

In addition, in FIGS. 10 through 13, reference numeral 22 designates a spring for locking the adjust screw 20, inserted between the head of the adjust screw 20 and the second support plate 75.

In the third embodiment, the fixing arm 1 is fixed to a fork crown H at the front fork of the bicycle as shown by the dot-and-dash lines in FIGS. 10 and 11.

In this construction, the fixed bolt 2, as is the former embodiment, is used for fixing the fixing arm 1 to the fork crown H or changing the fixed position of the arm 1. Also, in the third embodiment, the adjust screw 20 can be manipulated to easily change the mounting position of the supporting member 7 with respect to the fixing arm 1, in other words, the position of holding the outer sheath O.

Accordingly, when the wire W extends after use or the brake shoes wear out, in the embodiment in FIGS. 1 through 5, the lock nut 81 is loosened and the outer stop 8 is rotated to be adjusted in position with respect to the supporting member 7. While, in the third embodiment a length of the outer sheath is easily adjusted by controlling the adjust screw 20.

As is readily understood by those skilled in the art the foregoing description is of preferred embodiments of the disclosed device to which various changes and modifications may be made without departing from the spirit and scope of the invention.

What is claimed is:

1. A center-pull calliper bicycle brake comprising:
a horizontal fixing arm having an extension extending from a horizontally intermediate portion thereof in the direction of a control wire; a supporting member for supporting an outer sheath of said control wire connected with said extension, said supporting member having an elongated slot extending in the direction of said extension; a fixing bolt extending through said slot for fixing said fixing arm to a bicycle frame and permitting vertical adjustment of said fixing arm relative to said frame; a pair of brake arms pivoted to respective horizontal ends of said fixing arm; a pair of brake shoe holders integral with and extending from the ends of said brake arms; a pair of brake shoes respectively supported in said holders, each of said brake shoes having a braking surface for engaging with a bicycle rim, and upper and lower surfaces and a pair of side surfaces in continuation of said braking surface, said upper surface being curved upwardly at a lengthwise intermediate portion thereof along said rim and having a curvature smaller than that of an outer peripheral edge of said rim; and, actuating means connectable to said control wire for causing pivotal movement of said brake arms upon pulling movement of said control wire to thereby actuate said brake.

2. A center-pull tyoe calliper brake for a bicycle according to claim 1, wherein said actuating means comprises an extension on each of said brake arms extending toward the horizontal center of said fixing arm from the pivot position of each of said brake arms to said fixing arm, and a retainer engageable with the end of each said extensions and connected with said control wire.

3. A center-pull type calliper brake for a bicycle according to claim 2, wherein said retainer comprises at least one roller, said roller being rotatably supported to a support supported at the free end of said control wire.

4. A center-pull type calliper brake for a bicycle according to claim 1, wherein said supporting member for said outer sheath is formed by bending an end of said extension at said fixing arm and is integrated with said extension.

5. A center-pull type calliper brake for a bicycle according to claim 1, wherein said supporting member for said outer sheath is formed as a member separate from said fixing arm, said supporting member being mounted to said fixing arm by means permitting a change in position of said supporting member with respect to said arm in the moving direction of said control wire.

6. A center-pull type calliper brake for a bicycle according to claim 5, wherein at one of said fixing arm and supporting member is provided an adjusting bolt for adjusting said supporting member in position with respect to said fixing arm and at the other is provided a receiving body for receiving the tip of said adjusting bolt.

* * * * *